United States Patent
Stock

[11] Patent Number: 6,124,050
[45] Date of Patent: Sep. 26, 2000

[54] PROCESS FOR OPERATING A HIGH TEMPERATURE FUEL CELL INSTALLATION, AND HIGH TEMPERATURE FUEL CELL INSTALLATION

[75] Inventor: Andreas Stock, Flörsbachtal, Germany

[73] Assignee: Siemens Aktiengesellschaft, Munich, Germany

[21] Appl. No.: 09/188,727

[22] Filed: Nov. 9, 1998

Related U.S. Application Data

[63] Continuation of application No. PCT/DE97/00868, Apr. 28, 1997.

[30] Foreign Application Priority Data

May 7, 1996 [DE] Germany .......................... 196 18 331

[51] Int. Cl.⁷ .................................................. H01M 8/04
[52] U.S. Cl. .............................................. 429/13; 429/38
[58] Field of Search .................................. 429/13, 17, 38

[56] References Cited

U.S. PATENT DOCUMENTS

| | | | |
|---|---|---|---|
| 4,001,041 | 1/1977 | Reward | 429/17 |
| 4,333,992 | 6/1982 | Healy | 429/17 |
| 4,678,723 | 7/1987 | Wertheim | 429/17 |
| 4,865,926 | 9/1989 | Levy et al. | 429/17 X |
| 5,413,879 | 5/1995 | Domeracki et al. | 429/30 |
| 5,417,051 | 5/1995 | Ankersmit | 429/17 X |

FOREIGN PATENT DOCUMENTS

| | | |
|---|---|---|
| 0246649A1 | 11/1987 | European Pat. Off. . |
| 0400701A1 | 12/1990 | European Pat. Off. . |
| 4137968A1 | 5/1993 | Germany . |
| 19514469A1 | 8/1996 | Germany . |
| 19523972C1 | 8/1996 | Germany . |
| 19523973C1 | 12/1996 | Germany . |

Primary Examiner—Stephen Kalafut
Attorney, Agent, or Firm—Herbert L. Lerner; Laurence A. Greenberg; Werner H. Stemer

[57] ABSTRACT

A high temperature fuel cell installation includes at least one high temperature fuel cell block with an anode part and a cathode part. A process for operating the high temperature fuel cell installation includes feeding at least a portion of anode waste gas from the high temperature fuel cell block as working medium to a gas motor coupled to a generator in order to increase energy production. This measure guarantees highly efficient and flexible energy production.

6 Claims, 1 Drawing Sheet

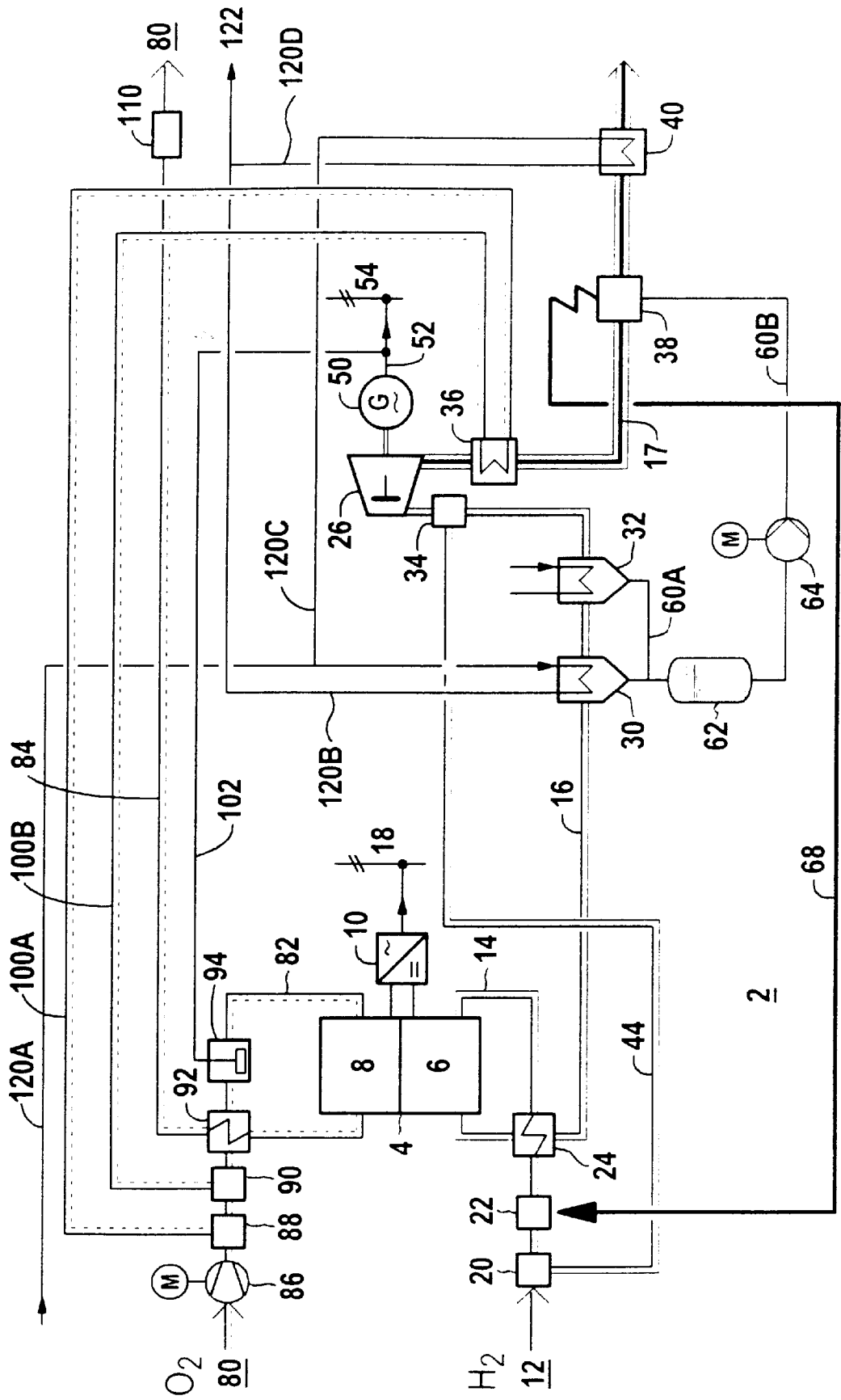

PROCESS FOR OPERATING A HIGH TEMPERATURE FUEL CELL INSTALLATION, AND HIGH TEMPERATURE FUEL CELL INSTALLATION

CROSS-REFERENCE TO RELATED APPLICATION

This application is a continuation of copending International Application PCT/DE97/00868, filed Apr. 28, 1997, which designated the United States.

BACKGROUND OF THE INVENTION

Field of the Invention

The invention relates to a process for operating a high temperature fuel cell installation and to a high temperature fuel cell installation.

It is known, that during the electrolysis of water, water molecules are decomposed by electric current into hydrogen ($H_2$) and oxygen ($O_2$). In a fuel cell, that process takes place in reverse. Electric current is produced with high efficiency by the electrochemical combination of hydrogen ($H_2$) and oxygen ($O_2$) to form water. If pure hydrogen ($H_2$) is used as combustion gas, the process takes place without the emission of pollutants and carbon dioxide ($CO_2$). Even with a technical combustion gas, for example natural gas or coal gas, and with air (which may additionally be enriched with oxygen ($O_2$)) instead of pure oxygen ($O_2$), a fuel cell produces considerably less pollutants and less carbon dioxide ($CO_2$) than other forms of energy production which operate by using fossil energy sources.

The technical implementation of the fuel cell principle has given rise to a variety of solutions, and more precisely with different electrolytes and with operating temperatures of between 80° C. and 1000° C.

Depending on their operating temperature, fuel cells are divided into low, medium and high temperature fuel cells, which in turn differ through various technical embodiments.

A high temperature fuel cell block (a fuel cell block is also referred to a "stack" in the specialist literature) is generally composed of a multitude of high temperature fuel cells which are of planar construction and are stacked on one another. Fuel cell installations including at least one high temperature fuel cell block are, for example, known from German Patent DE 195 23 973 C1, corresponding to U.S. application Ser. No. 09/001,043, filed Dec. 30, 1997; German Patent DE 195 23 972 C1; and German Published, Non-Prosecuted Patent Application DE 195 14 469 A1.

A high temperature fuel cell installation is operated with a high constant operating temperature of, for example, in excess of 900° C. For that purpose, the installation must be supplied with additional heat, in order to achieve the operating temperature before operation or to hold the required operating temperature during brief interruptions in operation.

A further problem is the need to use the working medium efficiently during operation of the high temperature fuel cell block. In order to make it possible to operate the high temperature fuel cell block with high efficiency, the working medium needs to be supplied in excess. It is only through an excess of working medium that it is possible to guarantee that the active surfaces of the high temperature fuel cells are provided with enough working medium. An unavoidable consequence of operating the high temperature fuel cell block with excess working medium is that, after the electrochemical reaction has taken place, there is still some working medium present in the waste gas or off-gas at the outlet of the high temperature fuel cell block. Put another way, the working medium is not fully consumed in the high temperature fuel cell block. Some of it emerges unused, and that impairs efficiency.

German Published, Non-Prosecuted Patent Application DE 41 37 968 A1 discloses a heat exchange device in which the waste gas from a high temperature fuel cell block is fed to an expansion turbine. In that case, the waste gas from the high temperature fuel cell block contains unconsumed air from the cathode waste gas and unconsumed hydrogen from the anode waste gas. In order to heat the waste gas to the input temperature of the expansion turbine, the waste gas is guided before feeding through a heat exchanger integrated in the high temperature fuel cell block. After having been fed into the turbine, the waste gas is expanded therein. That means that only the heat content of the waste gas is used for the production of energy in the turbine, but not actually the components of the waste gas, for example hydrogen.

SUMMARY OF THE INVENTION

It is accordingly an object of the invention to provide a process for operating a high temperature fuel cell installation and a high temperature fuel cell installation, which overcome the hereinafore-mentioned disadvantages of the heretofore-known methods and devices of this general type and in which efficient and flexible energy production is guaranteed.

With the foregoing and other objects in view there is provided, in accordance with the invention, a process for operating a high temperature fuel cell installation, which comprises providing at least one high temperature fuel cell block having an anode part and a cathode part; feeding at least a portion of anode waste gas from the high temperature fuel cell block as working medium to a gas motor coupled to a generator for increasing energy production; and withdrawing water and heat energy from the anode waste gas before feeding into the gas motor.

This process proves efficient since all of the working medium, unless consumed in the fuel cell block and therefore not present in the anode waste gas, is available to the gas motor as working medium for obtaining further energy. At the same time, the process proves flexible since the gas motor does not always need to be provided with the same amount of working medium from the anode waste gas at every operating time. If, at a particular operating time, there is not enough working medium in the anode waste gas to operate the gas motor, then the missing portion of working medium can be fed separately to the gas motor.

Preferably, water is withdrawn from the anode waste gas before feeding into the gas motor. In other words, the water produced during the electrochemical reaction in the high temperature fuel cell block is withdrawn from the anode waste gas, so that the working medium is present in a form which can be exploited by the gas motor. The anode waste gas also has some of its heat content withdrawn together with the water. The temperature of the anode waste gas, that is to say the working medium for the gas motor, is therefore reduced on the way from the high temperature fuel cell block to the gas motor.

In accordance with another mode of the invention, a working medium for the anode part is supplied with water in the form of water vapor before the feeding.

In accordance with a further mode of the invention, a portion of the electric current produced with the generator is used to heat a working medium when the high temperature fuel cell block is being started up. For example, at the start, the working medium provided for the high temperature fuel cell block in normal operation may be fed directly through a bypass to the gas motor, the energy of which is therefore used for electrically heating the high temperature fuel cell block. The high temperature fuel cell block may consequently be started up with the gas motor, which forms part of the overall high temperature fuel cell installation.

In accordance with an added mode of the invention, a working medium for the anode part and/or the cathode part of the high temperature fuel cell block is heated with the heat dissipated by the gas motor.

With the objects of the invention in view, there is also provided a high temperature fuel cell installation, comprising at least one high temperature fuel cell block including an anode part and a cathode part, the anode part having a discharge path; gas motor connected to the discharge path of the anode part; a generator coupled to the gas motor for increasing energy production; and at least one water precipitator disposed in the discharge path of the anode part.

Preferably, at least one water precipitator is provided in the discharge path of the anode part. The water removed from the anode waste gas by the at least one water precipitator may, for example, be fed through a feed water tank to a steam generator. The water which is subsequently evaporated is fed back to the working medium for the anode part of the high temperature fuel cell block. By virtue of this measure, even the water from the anode waste gas can be fed for reuse in the high temperature fuel cell block.

In accordance with another feature of the invention, there is provided at least one heat exchanger in the discharge line of the gas motor.

In accordance with a further feature of the invention, there is provided a steam generator in the discharge line of the gas motor. Through the use of the steam generator, the water from the waste gas of the anode part of the high temperature fuel cell block is evaporated for reuse in the cathode part.

In accordance with an added feature of the invention, the generator is connected to a heating device disposed in the feed path of the cathode part. A fraction of the electric current produced in the generator is used to heat the working medium for the cathode part.

In accordance with a concomitant feature of the invention, the generator is connected to an electrical network in order to feed it with electric current. The current may be fed to a load through the electrical network.

Other features which are considered as characteristic for the invention are set forth in the appended claims.

Although the invention is illustrated and described herein as embodied in a process for operating a high temperature fuel cell installation and a high temperature fuel cell installation, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

The FIGURE of the drawing is a schematic and block circuit diagram of a high temperature fuel cell installation.

DESCRIPTION OF THE PREFERRED EMBODIMENTS

Referring now in detail to the single FIGURE of the drawing, there is seen a high temperature fuel cell installation 2 that includes a high temperature fuel cell block 4 which is divided into an anode part 6 with non-illustrated anode gas spaces and a cathode part 8 with non-illustrated cathode gas spaces. The high temperature fuel cell block 4 is preferably composed of a multitude of non-illustrated high temperature fuel cells having a planar structure.

An invertor 10, which is connected to the high temperature fuel cell block 4, converts direct current produced by the high temperature fuel cell block 4 into alternating current for an electrical network 18.

The anode part 6 is associated with an anode path 12 for supplying it with a working medium, for example hydrogen ($H_2$) or a mixture of combustion gas and reaction vapor. The anode path 12 includes a feed path 14 and a discharge path 16. The working medium is referred to as "working medium for the anode part 6" before feeding it into the anode part 6, and it is referred to as "anode waste gas of the anode part 6" after it has left the anode part 6.

A gas splitter 20, a mixing chamber 22 and a heat exchanger 24 are successively disposed, in that order in the flow direction, in the feed path 14 of the anode part 6 of the high temperature fuel cell block 4. A gas motor 26 is connected to the discharge path 16 of the anode part 6 of the high temperature fuel cell block 4. The term "gas motor" in this context is intended to mean a device for converting chemical energy contained in the working medium (anode waste gas) into mechanical energy. A generator 50, which is coupled to the gas motor 26, converts the mechanical energy produced in the gas motor 26 into alternating current. The alternating current is delivered over a line 52 to an electrical network 54.

The waste gas or off-gas is discharged from the gas motor 26 by a discharge line 17 leading from the high temperature fuel cell installation 2. A heat exchanger 36, a steam generator 38 and a further heat exchanger 40 are successively disposed, in that order in the flow direction, in the discharge line 17.

Two water precipitators 30, 32 and a mixing chamber 34 are successively disposed, in that order in the flow direction, in the discharge path 16 of the anode part 6.

The working medium for the anode part 6 of the high temperature fuel cell block 4 is fed into the anode part 6 through the feed path 14. This being the case, the working medium firstly flows through the gas splitter 20, in which a fraction of the working medium is diverted from the feed path 14 through a line 44. That fraction of the working medium is fed directly into the mixing chamber 34 disposed upstream of the gas motor 26 in the discharge path 16 of the anode part 6. Operation of the gas motor 26 is therefore guaranteed even if not enough working medium is present in the anode waste gas or off-gas of the anode part 6 of the high temperature fuel cell block 4. The working medium for the anode part 6 is heated by the anode waste gas in the heat exchanger 24.

After an electrochemical reaction has taken place in the high temperature fuel cell block 4, the anode waste gas is discharged from the high temperature fuel cell block 4 through the discharge path 16. A large portion of process water produced during the reaction in the high temperature fuel cell block 4 is removed in the water precipitators 30 and 32 together with a fraction of the heat content of the anode waste gas.

After the process water has been removed from the anode waste gas, the cooled anode waste gas passes as working medium through the mixing chamber 34 into the gas motor 26. The working medium, i.e. the anode waste gas, is burnt to produce mechanical energy in the gas motor 26.

The process water which is removed from the anode waste gas by the water precipitators 30, 32 is evaporated in the steam generator 38. For this purpose, the process water from the water precipitators 30, 32 is fed to the steam generator 38 through lines 60A and 60B, in which a feed water tank 62 and a pump 64 are disposed. In this case the feed water tank 62 is used as a reservoir for the process water. The latter is fed through line 60B to the steam generator 38 by the pump 64 in the required quantity.

Water vapor produced in the steam generator 38 is fed through a line 68 to the mixing chamber 22 which is disposed in the feed path 14 of the anode part 6. The water vapor is therefore mixed with the working medium for the anode part 6 in order to heat this medium.

The heat obtained in the water precipitator 30 and in the further heat exchanger 40 can be fed through line 120A, 120B, 120C, and 120D carrying a heat-exchange medium into a local hot water network 122 which is not illustrated in detail.

The cathode part 8 of the high temperature fuel cell block 4 is associated with a cathode path 80 which includes a feed path 82 and a discharge path 84. A compressor 86, a gas splitter 88, a mixing chamber 90, a heat exchanger 92 and an electrical heating device 94 are successively disposed, in that order in the flow direction, in the feed path 82 of the cathode part 8.

The working medium for the cathode part 8 is fed to the cathode part 8 through the feed path 82. This being the case, the working medium, for example air or air enriched with oxygen ($O_2$), is fed into the gas splitter 88 by the compressor 86.

At least a fraction of the working medium for the cathode part 8 is diverted in the gas splitter 88 from the feed path 82 of the cathode part 8 and fed through a line 100A leading through the heat exchanger 36. That fraction is then fed through the line 100B back through the mixing chamber 90 to the feed path 82. The heat exchanger 36 is connected downstream of the gas motor 26 in the discharge line 17 for the waste gas from the gas motor 26. Therefore, the working medium for the cathode part 8 which is diverted from the feed path 82 is heated by the waste gas from the gas motor 26. The waste heat of the waste gas from the gas motor 26 is therefore advantageously used to heat the working medium for the cathode part 8.

The undiverted fraction of the working medium passes directly through the line 82 into the mixing chamber 90, where it is recombined with the diverted fraction. The working medium for the cathode part 8 is then heated in the heat exchanger 92 and in the electrical heating device 94. The working medium for the cathode part 8 is heated in the heat exchanger 92 by the cathode waste gas or off-gas, and it is electrically heated in the electrical heating device 94 for starting up the high temperature fuel cell block 4. In this case, the electrical heating device 94 is supplied with current from the generator 50 associated with the gas motor 26. The electrical heating device 94 in this case is supplied with current through a line 102 from the line 52.

The cathode waste gas is firstly fed through the discharge path 84 of the cathode part 8 leading through the heat exchanger 92, where it heats the working medium for the cathode part 8. It is then fed to a local heat-using system 110 which is not illustrated in detail.

Therefore, on one hand the gas motor 26 is operated by using the anode waste gas from the high temperature fuel cell block 4 and on the other hand the gas motor 26 is used for starting up the high temperature fuel cell block 4. The process water obtained during the electrochemical reaction in the high temperature fuel cell block 4 is fed in the form of water vapor to the working medium for the anode part 6 in order to heat it. Furthermore, the current produced by the gas motor 26 and the generator 50 is used to operate the electrical heating device 94 for heating the working medium for the cathode part 8 of the high temperature fuel cell block 4. In addition, the heat of the waste gas from the gas motor 26 preheats the working medium for the cathode part 8 of the high temperature fuel cell block 4.

It is therefore possible for the start-up process of the high temperature fuel cell installation 2 to be carried out by merely using components which are provided in the high temperature fuel cell installation 2.

I claim:

1. A process for operating a high temperature fuel cell installation, which comprises:

providing at least one high temperature fuel cell block having an anode part and a cathode part;

adding water vapor to a working medium for the anode part;

supplying the anode part with the working medium and all of the water vapor;

feeding at least a portion of anode waste gas from the high temperature fuel cell block as a working medium to a gas motor coupled to a generator for increasing energy production; and withdrawing water and heat energy from the anode waste gas before feeding the anode waste gas into the gas motor.

2. A process for operating a high temperature fuel cell installation, which comprises:

providing at least one high temperature fuel cell block having an anode part and a cathode part;

feeding at least a portion of anode waste gas from the high temperature fuel cell block as a working medium to a gas motor coupled to a generator for increasing energy production;

withdrawing water and heat energy from the anode waste gas before feeding the anode waste gas into the gas motor; and using a portion of electric current produced with the generator to heat a working medium for the high temperature fuel cell block when the high temperature fuel cell block is being started up.

3. A process for operating a high temperature fuel cell installation, which comprises:

providing at least one high temperature fuel cell block having an anode part and a cathode part;

feeding at least a portion of anode waste gas from the high temperature fuel cell block as a working medium to a gas motor coupled to a generator for increasing energy production;

withdrawing water and heat energy from the anode waste gas before feeding the anode waste gas into the gas motor; and heating a working medium for at least one of the anode and cathode parts of the high temperature fuel cell block with heat dissipated by exhaust gas of the gas motor.

4. A high temperature fuel cell installation, comprising: at least one high temperature fuel cell block including an anode part and a cathode part, said anode part having a discharge path;

a gas motor connected to said discharge path of said anode part, said gas motor having a discharge line, and at least one heat exchanger disposed in said discharge line of said gas motor;

a generator coupled to said gas motor for producing energy; and at least one water precipitator disposed in said discharge path of said anode part.

5. A high temperature fuel cell installation, comprising:

at least one high temperature fuel cell block including an anode part and a cathode part, said anode part having a discharge path;

a gas motor connected to said discharge path of said anode part, said gas motor having a discharge line, and at least one heat exchanger disposed in said discharge line of said gas motor;

a steam generator disposed in said discharge line of said gas motor;

a generator coupled to said gas motor for producing energy; and at least one water precipitator disposed in said discharge path of said anode part.

6. A high temperature fuel cell installation, comprising:

at least one high temperature fuel cell block including an anode part and a cathode part, said anode part having a discharge path, said cathode part having a feed path;

a gas motor connected to said discharge path of said anode part;

a generator coupled to said gas motor for producing energy;

an electrical heating device connected to said generator and disposed in said feed path of said cathode part; and at least one water precipitator disposed in said discharge path of said anode part.

* * * * *